US007260747B2

(12) United States Patent
Matsumura

(10) Patent No.: US 7,260,747 B2
(45) Date of Patent: Aug. 21, 2007

(54) COOPERATIVE PROCESSING SYSTEM, COOPERATIVE PROCESSING APPARATUS, AND COOPERATIVE PROCESSING METHOD

(75) Inventor: Ryoji Matsumura, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 495 days.

(21) Appl. No.: 10/797,085

(22) Filed: Mar. 11, 2004

(65) Prior Publication Data

US 2005/0039087 A1 Feb. 17, 2005

(30) Foreign Application Priority Data

Aug. 13, 2003 (JP) ............................ 2003-292798

(51) Int. Cl.
*G06F 11/00* (2006.01)

(52) U.S. Cl. ........................... 714/38; 714/15; 714/37; 714/39; 714/44; 714/47; 714/48

(58) Field of Classification Search ................. 714/15, 714/37-39, 44, 47, 48
See application file for complete search history.

(56) References Cited

U.S. PATENT DOCUMENTS 6,369,903 B1 * 4/2002 Kim .......................... 358/1.13
6,885,469 B1 * 4/2005 Tanimoto .................. 358/1.14
6,898,733 B2 * 5/2005 Parks et al. .................... 714/15
2004/0083470 A1 * 4/2004 Michimura et al. ......... 717/168
2004/0172602 A1 * 9/2004 Iida et al. ................... 715/530
2004/0193746 A1 * 9/2004 Koyama ........................ 710/9
2004/0194010 A1 * 9/2004 Kirihara et al. ............. 715/500
2005/0027825 A1 * 2/2005 Hikawa et al. ............. 709/219

FOREIGN PATENT DOCUMENTS

JP A 10-283319 10/1998

* cited by examiner

*Primary Examiner*—Robert W. Beausoliel
*Assistant Examiner*—Charles Ehne
(74) *Attorney, Agent, or Firm*—Oliff & Berridge, PLC

(57) ABSTRACT

A cooperative processing apparatus for executing a cooperative process of respective services based on cooperative instruction information representing an instruction for cooperating a plurality of services for respectively executing predetermined processes on document data, on a network, the cooperative processing apparatus includes: an error determining section that determines an error which occurs in a service in the cooperative process; a document detecting section that detects the presence or absence of document data processed by the cooperative process; and a cooperative control section that reexecutes the cooperative process based on the error determined by the error determining section and the presence or absence of document data detected by the document detecting section.

12 Claims, 3 Drawing Sheets

FIG.2

| INSTRUCTION FORM | |
|---|---|
| S1 | INPUT : C:¥···<br>PROCESS :<br>OUTPUT : C:¥··· |
| S2 | INPUT : C:¥···<br>PROCESS :<br>OUTPUT : C:¥··· |
| S3 | INPUT : C:¥···<br>PROCESS :<br>OUTPUT : C:¥··· |

FIG.3

| EXECUTED SERVICE TYPE | ERROR LEVEL | RESTARTING INPUT DOCUMENT | |
|---|---|---|---|
| | | PRESENT | ABSENT |
| CANCELABLE | RECOVERABLE | R1 | N1 |
| | UNRECOVERABLE | N2 | N2 |
| NONCANCELABLE | RECOVERABLE | R1, R2 | N1, N3 |
| | UNRECOVERABLE | N2, N3 | N2, N3 |

COOPERATIVE PROCESSING SYSTEM, COOPERATIVE PROCESSING APPARATUS, AND COOPERATIVE PROCESSING METHOD

CROSS-REFERENCE TO RELATED APPLICATION

This application claims priority under 35USC 119 from Japanese Patent Application No. 2003-292798 the disclosure of which is incorporated by reference herein.

BACKGROUND OF THE INVENTION

1. Field of the Invention

The present invention relates to a cooperative processing system, a cooperative processing apparatus, and a cooperative processing method. Particularly, the invention relates to the cooperative processing system, the cooperative processing apparatus, and the cooperative processing method which reexecute a cooperative process of plural services when an error occurs during the cooperative process.

2. Description of the Related Art

A service processing system, which executes a job flow of a document is conventionally suggested. When predetermined processes which are prespecified (document process such as delivery, pickup, transmission, conversion, storage and the like) cannot be executed due to any cause, the service processing system interrupts the predetermined processes or the predetermined processes are alternatively executed by a prespecified alternate apparatus.

Even if the alternate apparatus is provided, however, when an error occurs in some services, the alternate apparatus cannot cope with it. For example, when an error occurs after document data are subject to an image process or the document data are delivered, an original of document data are lost. For this reason, the job flow cannot be reexecuted, and thus the job flow cannot be completed.

SUMMARY OF THE INVENTION

The present invention is suggested in order to solve the above problems.

A cooperative processing apparatus from a first aspect of the invention for executing a cooperative process of respective services based on cooperative instruction information representing an instruction for cooperating a plurality of services for respectively executing predetermined processes on document data, on a network, the apparatus includes: an error determining section that determines an error which occurs in a service in the cooperative process; a document detecting section that detects the presence or absence of document data processed by the cooperative process; and a cooperative control section that reexecutes the cooperative process based on the error determined by the error determining section and the presence or absence of document data detected by the document detecting section.

Further, a cooperative processing method from a second aspect of the invention of making a computer execute a cooperative process of respective services based on cooperative instruction information representing an instruction for cooperating a plurality of respective services for respectively executing predetermined processed on document data, on a network, the method includes: the step of determining an error which occurs in a service in the cooperative process; the step of detecting the presence or absence of document data processed by the cooperative process; and the cooperative control step of reexecuting the cooperative process based on the error determined at the error determining step and the presence or absence of document data detected at the document detecting step.

A cooperative processing system from a third aspect of the invention including a plurality of service processing apparatuses for cooperatively executing a plurality of services for respectively executing predetermined processes on document data, on a network; and a cooperative processing apparatus for making the service processing apparatuses execute a cooperative process based on cooperative instruction information representing an instruction for cooperatively executing the services. The cooperative processing apparatus includes: an error determining section that determines an error which occurs in a service in the cooperative process, a document detecting section that detects the presence or absence of document data processed by the cooperative process, and a cooperative control section that reexecutes the cooperative process based on the error determined by the error determining section and the presence or absence of document data detected by the document detecting section.

In the above invention, the services are accessible functions relating to documents responding to external requests. The services include, for example, copying, printing, scanning, facsimile transmission/reception, mail delivery, and the like, but the services are not particularly limited. The cooperative processing apparatus controls the execution of the services for each service according to the sequence of the cooperative process based on an instruction form.

The error determining section determines an error, which has occurred in a service in the cooperative process. The error determining section preferably determines whether the error is recoverable or unrecoverable. This is because, in a case of the unrecoverable error, the cooperative process cannot be reexecuted.

The document detecting section detects the presence or absence of document data processed by the cooperative process. The reason that a determination is made whether the document data remain in the cooperative process is because when the document data remain, the instruction form can be reexecuted easily by using the document data.

The cooperative control section reexecutes the cooperative process based on the error determined by the error determining section and the presence or absence of document data detected by the document data detecting section. For example, when a recoverable error is determined and document data remain, the error can be canceled after a predetermined amount of time passes. The cooperative control section can, therefore, reexecute the job flow using the document data. That is to say, the cooperative control section can execute a suitable error process according to error contents or the presence or absence of document data.

As mentioned above, the invention reexecutes the cooperative process based on the error determined by the error determining section and the presence or absence of document data detected by the document detecting section. As a result, in the invention, even if an error occurs during the execution of the job flow described in the instruction form, a suitable error process is executed according to the error contents and the presence or absence of the document. For this reason, the job flow described in the instruction form can be executed as completely as possible.

BRIEF DESCRIPTION OF THE DRAWINGS

FIG. 2 is a diagram illustrating a schematic constitution of an instruction form.

FIG. 3 is a diagram illustrating a combination condition table stored in a cooperative control unit.

DESCRIPTION OF THE PREFERRED EMBODIMENTS

Figure 1:
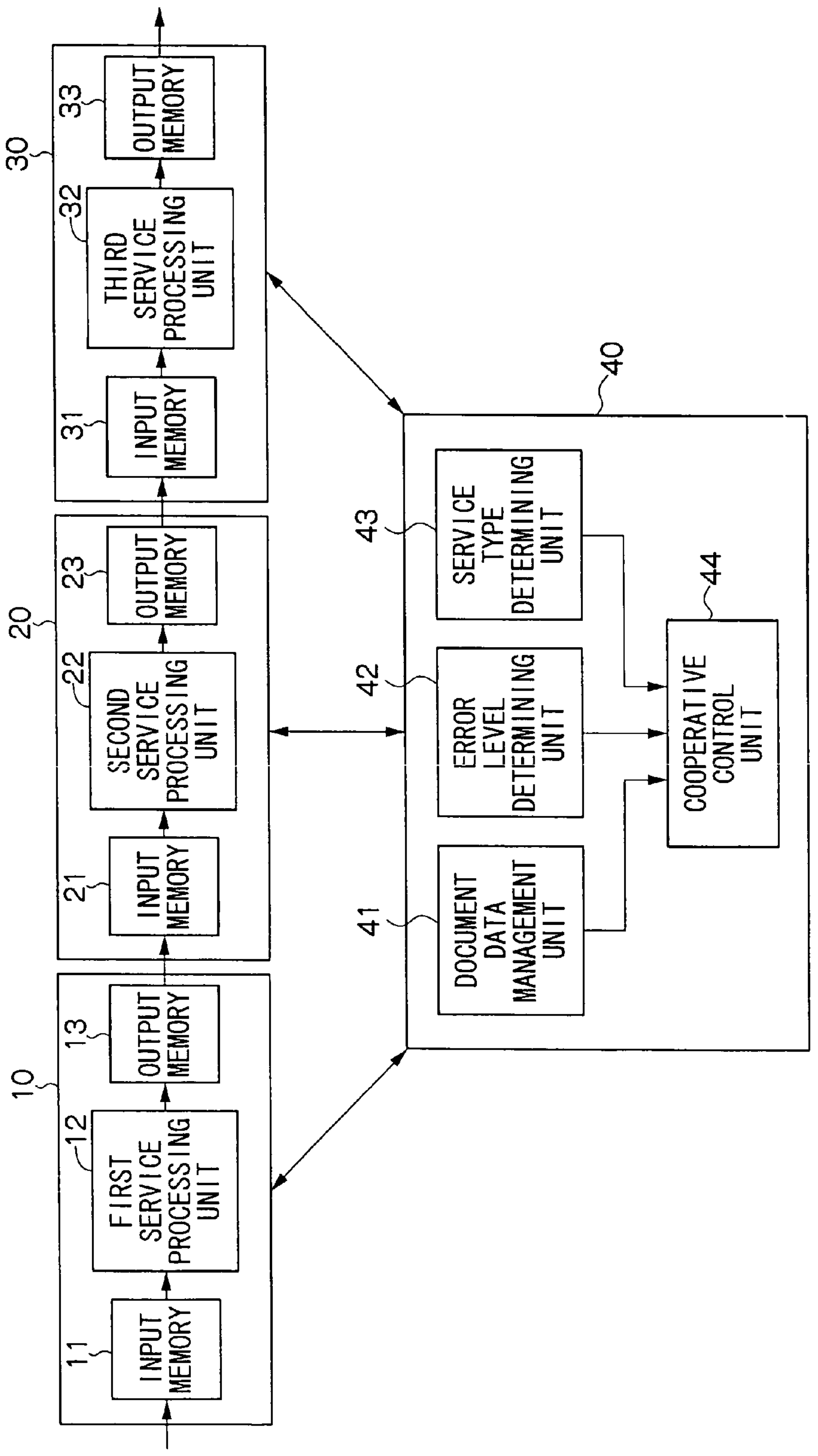
FIG. 1 is a diagram illustrating a constitution of a service processing system according to an embodiment of the present invention.

A preferred embodiment of the present invention is explained below with reference to the drawings.

FIG. 1 is a diagram illustrating a constitution of a service processing system according to an embodiment of the invention. The service processing system is constituted so that various services and applications are connected via a network.

The services are functions which relate to documents, and which are usable in response to external requests. The services include, for example, copying, printing, scanning, facsimile transmission/reception, mail delivery, storing to and reading from a repository, OCR (Optical Character Recognition) processing, noise reduction processing and the like. The services are not particularly limited.

The service processing system has a first service processing apparatus 10, a second service processing apparatus 20, a third service processing apparatus 30 and a cooperative processing apparatus 40. The first service processing apparatus 10 executes a first service on document data. The second service processing apparatus 20 executes a second service on document data. The third service processing apparatus 20 executes a third service on document data. The cooperative processing apparatus 40 executes a cooperative process of plural services (hereinafter, "job flow") based on an instruction form.

The instruction form is data including information representing a relationship between the services (job flow) in the case where a series of processing is divided into plural functional processes, interface (I/F) information for calling up the services, and information for composing a graphical user interface (GUI) relating to the job flow.

FIG. 2 is a diagram illustrating a schematic constitution of the instruction form. The job flow, which cooperatively processes three services S1, S2 and S3 is described in the instruction form. Addresses which indicate locations for reading of the document data, contents of the services, and addresses which indicate storage destination of the processed document data are described for respective services S1 to S3 in the instruction form.

The first service processing apparatus 10 includes an input memory 11 for inputting the document data thereto, a first service processing unit 12 for executing the first service on the document data, and an output memory 13 for temporarily storing and then outputting the document data which have undergone the first service process. The input memory 11 and the output memory 13 may be constituted by a common memory.

The second service processing apparatus 20 and the third service processing apparatus 30 are constituted similarly to the first service processing apparatus 10. The first service processing unit 12, a second service processing unit 22 and a third service processing unit 32 execute different services, respectively.

The cooperative processing apparatus 40 includes a document data management unit 41, an error level determining unit 42, a service type determining unit 43 and a cooperative control unit 44. The document data management unit 41 manages the document data processed by the first to the third service processing units 10, 20 and 30, respectively. The error level determining section 42 determines an error level of the services. The service type determining unit 43 determines a type of a service in which an error has occurred. The cooperative control unit 44 controls the job flow based on the instruction form.

When document data respectively processed by the first to the third service processing apparatuses 10, 20 and 30 is present, the document data management unit 41 stores the document data. The document data management unit 41 manages which data are processed by which of the first to the third service processing apparatuses 10, 20 and 30.

When an error occurs in any one of the first to the third service processing apparatuses 10, 20 and 30 during execution of the job flow, the error level determining unit 42 determines an error level which represents whether the error is "recoverable" or "unrecoverable".

A recoverable error is an error, which occurs because the service temporarily cannot be executed. In this case, when a predetermined amount of time passes, the service is again in an executable state. For example, when a busy signal is generated by a recording medium such as a memory or a magnetic disc, this corresponds to the case where a communication line is temporarily busy or the like. An unrecoverable error is an error, which occurs because a service cannot be executed due to a problem with hardware or software. In this case, even if a predetermined amount of time passes, the service cannot be executed.

The service type determining unit 43 determines a service type of each executed service from the start of the execution of the job flow to the occurrence of the error. Concretely, the service type determining unit 43 determines whether each service is a cancelable service or a noncancelable service. A noncancelable service corresponds to printing, facsimile transmission, mail transmission or the like. In contrast, a cancelable service corresponds to, for example, image processing. The reason for this is that if the document data being subject to the image processing is discarded and the document data before the image processing is used, the image processing can be reexecuted.

The cooperative control unit 44 normally controls the first to the third service processing apparatuses 10, 20 and 30 so that they execute the job flow based on the instruction form. At this time, the cooperative control unit 44 monitors response signals transmitted from the first to the third service processing apparatuses 10, 20 and 30 so as to check whether the job flow is executed normally.

Further, when an error occurs during the execution of the job flow, the cooperative control unit 44 can reexecute the job flow according to the error state. The cooperative control unit 44 reexecutes the job flow based on the following combination condition table.

FIG. 3 is a diagram illustrating the combination condition table stored in the cooperative control unit 44.

"Present" or "Absent" under "Restartable Input Document" is determined by the cooperative control unit 44 based on the management condition of document data management unit 41. Concretely, when the document data management unit 41 stores therein the document data processed by any one of the first to the third service processing apparatuses 10, 20 and 30, the cooperative control unit 44 determines that the "restartable input document" is "present".

Further, when the document data management unit 41 does not store the document data therein, the cooperative control unit 44 determines that the "restartable input document" is "absent". That is to say, when the document data on which the job flow can be reexecuted during the job flow remain, the cooperative control unit 44 determines that the "restartable input document" is "present, and when the document data do not remain, it determines that the restartable input document" is "absent".

"Cancelable" or "Noncancelable" under "Executed Service Type" is determined by the cooperative control unit 44 based on the determined result by the service type determining unit 43. Concretely, when even one noncancelable service is present in the executed services constituting the job flow, the cooperative control unit 44 determines that the executed service type is "noncancelable" based on the determined result by the service type determining unit 43. Further, when no noncancelable service is present in the executed services, all of the service in the job flow can be canceled, and the cooperative control unit 44 therefore determines that the executed service type is "cancelable".

"Recoverable" or "Unrecoverable" under "Error Level" is determined by the error level determining unit 42.

The cooperative control unit 44 compares the three determined results with the combination condition table shown in FIG. 3 and executes a reexecution process (any one of N1 to N3, R1 and R2 shown in FIG. 3) corresponding to the combination of the determined results by the document data management unit 41, the error level determining unit 42 and the service type determining unit 43.

"N" represents a notification to a user. Concretely, "N1" represents a notification which urges a user to reexecute the job flow from the beginning because the execution of the job flow has failed. "N2" represents a notification that the execution of the job flow has failed and an unrecoverable error has occurred. "N3" represents a notification that the execution of the job flow has failed and a noncancelable service had been executed at that time.

"R" represents the reexecution of the job flow. Concretely, "R1" represents that a service, which is closest to and previous to the service in which an error has occurred (including the service itself in which the error has occurred) is reexecuted. "R2" represents that while a noncancelable service is being skipped, the job flow is reexecuted.

In the service processing system having such a constitution, the cooperative processing apparatus 40 causes the first service processing apparatus 10, the second service processing apparatus 20, and the third service processing apparatus 30 to execute the first through the third services in this order according to the job flow described in the instruction form.

For example, when "executed service type" is "cancelable", "error level" is "recoverable", and "restartable input document" is "present" at the time of the occurrence of an error in the job flow, the cooperative control unit 44 instructs the reexecution of "R1". That is to say, the cooperative control unit 44 traces to a service, which is closest to the service with the error in the reverse order of the job flow (including the service itself in which the error has occurred). The closest service is a service which is closest in order from the service with the error among services which can process the document data stored in the document data management unit 41. The cooperative control unit 44 reexecutes the job flow starting from the closest service by using the document data which is to be input into the closest service.

As a result, even if an error occurs in the job flow, when an error is recoverable and the document data are present, the cooperative processing apparatus 40 can reexecute the job flow using the document data.

As another example, in a case where "executed service type" is "noncancelable", "error level" is "recoverable" and "restartable input document" is "present" at the time of occurrence of an error in the job flow, the cooperative control unit 44 instructs the reexecution of not only "R1" but also "R2". That is to say, the cooperative control unit 44 traces to a service, which is closest to the service with an error in the reverse order of the job flow as mentioned above. The cooperative control unit 44 uses the document data which is to be input into the closest service, and reexecutes the job flow starting from the closest service. When the cooperative control unit 44 comes to a noncancelable service, it skips this service, and proceeds to execute the next service.

As a result, even if an error occurs in the job flow after the noncancelable service is executed, when an error is recoverable and the document data are present, the cooperative processing apparatus 40 skips the noncancelable service, and proceeds to execute the job flow using the document data.

In a case where "restartable input document" is "absent" or "error level" is "unrecoverable", the cooperative processing apparatus 40 can notify the user of the state of the error and a reexecution instruction according to the combination condition table by, for example, delivering an e-mail or displaying on a user interface.

As described above, when an error occurs during the execution of the job flow described in the instruction form, the cooperative processing apparatus 40 executes appropriate error processing according to the executed service type or the state of document data. For this reason, the job flow described in the instruction form can be executed as completely as possible.

The invention is not limited to the above embodiment, and needless to say, design modification can be applied to the invention within the scope described in the claims.

The embodiment exemplifies a case where three services are cooperative in series as the job flow described in the instruction form. The invention is not limited to this example, and two, four, or more than four services may be cooperative in series or in parallel.

Further, in the embodiment, the cooperative processing apparatus 40 manages the document data processed by the first to the third service processing apparatuses 10, 20 and 30. However, for example, an unillustrated management sever may manage the document data. Moreover, the first to the third service processing apparatuses 10, 20 and 30 may store therein the document data processed thereby until the final step of the job flow is executed.

Further, any one of the first service processing apparatus 10, the second service processing apparatus 20, and the third service processing apparatus 30 may have the function of the cooperative processing apparatus 40 and may monitor whether the job flow is completed according to the instruction form.

What is claimed is:

1. A cooperative processing apparatus for executing a cooperative process of respective services based on cooperative instruction information representing an instruction for cooperating a plurality of services for respectively executing predetermined processes on document data, on a network, the cooperative processing apparatus comprising:

an error determining section that determines an error which occurs in a service in the cooperative process;

a document detecting section that detects the presence or absence of document data processed by the cooperative process; and a cooperative control section that reexecutes the cooperative process based on the error determined by the error determining section and the presence or absence of document data detected by the document detecting section, wherein when an error determined by the error determining section is a recoverable error and the document detecting section detects that document data are present, the cooperative control section reexecutes the cooperative process starting from a service which is closest to and previous to the service in which the error has occurred in the cooperative process.

2. A cooperative processing apparatus according to claim 1, further comprising a service type determining section that determines types of the services constituting the cooperative process, wherein the cooperative control section reexecutes the cooperative process further based on the service types determined by the service type determining section.

3. A cooperative processing apparatus according to claim 2, wherein when a service type determined by the service type determining section is a type of noncancelable service, the cooperative control section reexecutes the cooperative process so as to skip the noncancelable service.

4. A cooperative processing apparatus according to claim 1, wherein when an error determined by the error determining section is an unrecoverable error and the document detecting section detects that document data are not present, the cooperative control section carries out a predetermined notification.

5. A cooperative processing method of making a computer execute a cooperative process of respective services based on cooperative instruction information representing an instruction for cooperating a plurality of services for respectively executing predetermined processes on document data, on a network, the method comprising:

a step of determining an error which occurs in a service in the cooperative process;

a step of detecting the presence or absence of document data processed by the cooperative process; and a cooperative control step of reexecuting the cooperative process based on the error determined at the error determining step and the presence or absence of document data detected at the document detecting step, wherein when an error determined at the error determining step is a recoverable error and the presence of document data are determined at the document detecting step, the cooperative process is reexecuted, at the cooperative control step, starting from a service which is closest to and previous to the service in which the error has occurred in the cooperative process.

6. A cooperative processing method according to claim 5, further comprising a service type determining step of determining types of services constituting the cooperative process, wherein at the cooperative control step, the cooperative process is reexecuted further based on the service types determined at the service type determining step.

7. A cooperative processing method according to claim 6, wherein when a service type determined at the service type determining step is a type of noncancelable service, the cooperative process is reexecuted so that the noncancelable service is skipped at the cooperative control step.

8. A cooperative processing method according to claim 5, wherein when an error determined at the error determining step is an unrecoverable error and the absence of document data are detected at the document detecting step, a predetermined notification is carried out at the cooperative control step.

9. A cooperative processing system comprising:

a plurality of service processing apparatuses for cooperatively executing a plurality of services for respectively executing predetermined processes on document data, on a network; and a cooperative processing apparatus for making the service processing apparatuses execute a cooperative process based on cooperative instruction information representing an instruction for cooperatively executing the services, wherein the cooperative processing apparatus includes, an error determining section that determines an error which occurs in a service in the cooperative process, a document detecting section that detects the presence or absence of document data processed by the cooperative process, and a cooperative control section that reexecutes the cooperative process based on the error determined by the error determining section and the presence or absence of document data detected by the document detecting section, wherein, when an error determined by the error determining section is a recoverable error and the document detecting section detects that document data are present, the cooperative control section reexecutes the cooperative process starting from a service which is closest to and previous to the service in which the error has occurred in the cooperative process.

10. A cooperative processing system according to claim 9, wherein:

the cooperative processing apparatus further includes a service type determining section that determines types of the services constituting the cooperative process; and the cooperative control section reexecutes the cooperative process further based on the service type determined by the service type determining section.

11. A cooperative processing system according to claim 10, wherein when a service type determined by the service type determining section is a type of noncancelable service, the cooperative control section reexecutes the cooperative process so as to skip the noncancelable service.

12. A cooperative processing system according to claim 9, wherein when an error determined by the error determining section is an unrecoverable error and the document detecting section detects that document data are not present, the cooperative control section carries out a predetermined notification.

* * * * *